United States Patent
Wooldridge et al.

[11] 3,857,952
[45] Dec. 31, 1974

[54] CERTAIN BENZENE DERIVATIVES USEFUL IN TREATING CARDIAC DISORDERS

[75] Inventors: Kenneth Robert Harry Wooldridge, Brentwood; Berkeley Basil, Highwood, near Chelmsford, both of England

[73] Assignee: May & Baker Limited, Dagenham, Essex, England

[22] Filed: Aug. 3, 1972

[21] Appl. No.: 277,607

Related U.S. Application Data

[62] Division of Ser. No. 785,403, Dec. 19, 1968, Pat. No. 3,726,919.

[30] Foreign Application Priority Data

Dec. 22, 1967  Great Britain .................... 58516/67
May 14, 1968  Great Britain .................... 56513/68
Aug. 2, 1968  Great Britain .................... 37103/68

[52] U.S. Cl. ............................................. 424/324
[51] Int. Cl. ............................................. A61k 27/00
[58] Field of Search ......................... 424/324, 330

[56] References Cited
UNITED STATES PATENTS

| 3,408,387 | 10/1968 | Mowe et al. ..................... 260/482 |
| 3,726,919 | 4/1973 | Wooldridge et al. ........... 260/562 A |

Primary Examiner—Albert T. Meyers
Assistant Examiner—Leonard Schenkman
Attorney, Agent, or Firm—Stevens, Davis, Miller & Mosher

[57] ABSTRACT

Benzene derivatives of the formula:

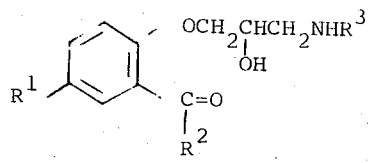

wherein $R^1$ represents alkanoyl amino of not more than nine carbon atoms, $R^2$ represents alkyl of one through six carbon atoms, and $R^3$ represents alkyl of one through six carbon atoms or cycloalkyl of three through six carbon atoms, possess pharmacodynamic properties and are useful in the treatment of various cardiac disorders.

3 Claims, No Drawings

CERTAIN BENZENE DERIVATIVES USEFUL IN TREATING CARDIAC DISORDERS

This is a division of application Ser. No. 785,403, filed Dec. 19, 1968, now U.S. Pat. No. 3,726,919.

This invention relates to new benzene derivatives.

According to the present invention there are provided the new benzene derivatives of the general formula:

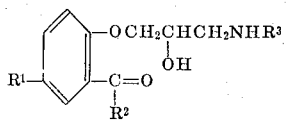

wherein $R^1$ represents a straight- or branched-chain alkanoylamino group containing not more than nine (preferably not more than six) carbon atoms, $R^2$ represents an alkyl group, and $R^3$ represents an alkyl group, or a cycloalkyl group containing from three or six carbon atoms, and their acid addition salts.

In this specification it is to be understood that the alkyl groups represented by the symbols $R^2$ and $R^3$ contain not more than six carbon atoms and may have straight- or branched-chains.

The compounds of general formula I exist in stereoisomeric forms and the present invention includes all such forms, and mixtures thereof, and their acid addition salts.

The new benzene derivatives of formula I and their non-toxic acid addition salts possess pharmacodynamic properties of value in the treatment or prophylaxis of various cardiac disorders manifested by angina pectoris and cardiac arrhythmias and, administered in conjunction with a sympathetic α-receptor blocking agent, in the relief, prior to surgery, of the symptoms of pheochromocytoma which are due, as is known, to the presence of high amounts of noradrenaline in the blood stream.

In laboratory screening methods, the new compounds inhibit sympathetic β-receptors in the rat, guinea-pig, cat and dog at doses which do not inhibit sympathetic α-receptors or have other untoward cardiovascular actions. In addition, the compounds show a specificity of action in that they have a substantial blocking action on cardiac β-receptors at dosages substantially lower than those required to have a substantial blocking action on sympathetic β-receptors in bronchial muscle and the vascular system. This property is of particular value in the treatment of conditions in which blocking sympathetic β-receptors in the bronchi is contraindicated, e.g. in bronchial asthma and various forms of bronchospasm.

For example, (I) the new compounds block the cardiac sympathetic β-receptors in the guinea-pig at doses between 0.01 and 0.1 mg/kg. animal body weight administered intravenously, which are lower than those required to inhibit sympathetic β-receptors on bronchial muscle as determined by their ability to reduce isoprenaline-induced bronchodilatation at doses between 0.15 and 3.0 mg/kg. animal body weight administered intravenously and the absence of potentiation of anaphylactic bronchospasm in this species at doses below 5 mg./kg. animal body weight administered intravenously. (II) The compounds also show specificity of action in the cat anaesthetized with a mixture of chloralose and pentobarbital sodium administered intraperitoneally as shown by their inhibition (at doses between 0.025 and 0.1 mg./kg. animal body weight administered intravenously) of the positive chronotropic effects upon cardiac muscle of intravenously-administered isoprenaline and by their inhibition (at doses between 0.05 and 0.2 mg./kg. animal body weight administered intravenously) of the effects of accelerans nerve stimulation, as compared with their inhibition (at doses between 0.15 and 3.0 mg./kg. animal body weight administered intravenously) of the fall in diastolic pressure produced by intravenously-administered isoprenaline and their inhibition (at doses between 0.5 and 2.0 mg./kg. animal body weight administered intravenously) of the bronchodilatation produced by intravenously-administered isoprenaline. (III) A specificity of action on sympathetic β-receptors is also shown by the new compounds in experiments carried out in the dog anaesthetized with intravenously-administered pentobarbital sodium as shown by their effect in inhibiting (at doses between 0.01 and 0.1 mg./kg. animal body weight administered intravenously) the positive inotropic and chronotropic effects upon cardiac muscle of intravenously-administered isoprenaline and in inhibiting (at doses between 0.02 and 0.2 mg./kg. animal body weight administered intravenously) the effects of accelerans nerve stimulation, which doses are lower than the doses required (0.2 to 2.0 mg./kg. animal body weight administered intravenously) to inhibit the fall in diastolic pressure produced by intravenously-administered isoprenaline. (IV) In addition, the new compounds correct experimentally-induced cardiac arrhythmias. For example, in the cat anaesthetized with a mixture of chloralose and pentobarbital sodium administered intraperitoneally and in the dog anaesthetized with pentobarbital sodium administered intravenously, reversal of the ventricular tachycardia produced by the intravenous administration of ouabain and a return to normal sinus rhythm is obtained at doses between 3.0 and 30 mg./kg. animal body weight administered intravenously. They also increase the refractory period of isolated rabbit atria to electrical stimulation by the method described by G. S. Dawes, Br. J. Pharmac, Chemother, 1, 90 (1946) in concentrations comparable to the concentrations of quindine which produce a similar increase in the refractory period.

The compound propranolol, which is used clinically in the treatment or prophylaxis of angina pectoris and cardiacarrhythmias and, administered in conjunction with a sympathetic α-receptor blocking agent, in the relief, prior to surgery, of the symptoms of pheochromocytoma, gives similar results in these tests but does not show specificity of action on cardiac as opposed to bronchial sympathetic β-receptors.

The benzene derivatives of formula I wherein $R^1$ is an alkanoylamino group containing not more than six carbon atoms are also useful as starting materials for the preparation of corresponding compounds of the aforesaid formula but in which the ketone group $—COR^2$ is replaced by a grouping

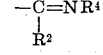

wherein $R^4$ represents, for example, a hydroxy, ureido, alkylureido, hydroxyalkylureido, alkoxyalkylureido, thioureido, alkylthioureido, hydroxyalkylthioureido, alkoxyalkylthioureido, heterocyclylureido or heterocyclylcarbonylamino group, and $R^2$ is as hereinbefore defined), which compounds are described in and included within the claims of the specification of our copending application Ser. No. 729,394 filed May 15th 1968, and now abandoned, and possess similar pharmacodynamic properties to those mentioned above in respect of the benzene derivatives of general formula I.

Preferred compounds of the present invention for the treatment of cardiac disorders are the compounds of general formula I wherein $R^3$ represents an alkyl group, especially those compounds in which $R^3$ represents an isopropyl group, and more particularly 5'-acetamido-2'-(2-hydroxy-3-isopropylaminopropoxy)acetophenone, 2'-(2-hydroxy-3-isopropylaminopropoxy)-5'-propionamidopropiophenone and 5'-butyramido-2'-(2-hydroxy-3-isopropylaminopropoxy)acetophenone and their non-toxic acid addition salts.

According to a feature of the present invention, the compounds of general formula I are prepared by the reaction of an epoxide of the general formula:

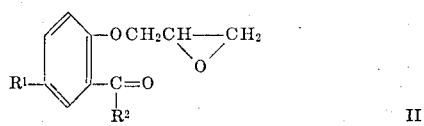

(wherein $R^1$ and $R^2$ are as hereinbefore defined) with an amine of general formula $R^3NH_2$ (wherein $R^3$ is as hereinbefore defined) in an inert organic solvent such as dimethylformamide or a lower alkanol (e.g. methanol or ethanol) at a temperature between 0°C. and 100°C.

The epoxides of general formula II may be prepared by known methods for the preparation of epoxides, e.g. by the reaction of epichlorohydrin with a phenol of the general formula:

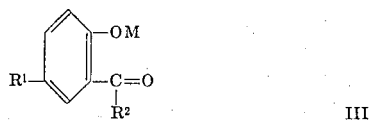

(wherein $R^1$ and $R^2$ are as hereinbefore defined, and M represents a hydrogen or alkali metal atom) in an aqueous or inert organic solvent, such as dimethylformamide or a lower alkanol (e.g. ethanol), at a temperature between 0°C. and 100°C. When N represents a hydrogen atom, the reaction is carried out in the presence of a basic condensing agent (e.g. potassium carbonate, sodium hydroxide or sodium ethoxide).

Compounds of general formula III wherein M represents an alkali metal atom may be prepared by known methods for the preparation of alkali metal derivatives of phenols, for example by treating a compound of general formula III wherein M represents a hydrogen atom with a solution of an alkali metal alkoxide (e.g. sodium ethoxide) in a lower alkanol (e.g. ethanol).

Compounds of general formula III wherein M represents a hydrogen atom may be prepared by known methods such as heating an ester of the general formula:

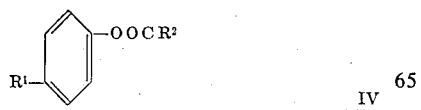

(wherein $R^1$ and $R^2$ are as hereinbefore defined) with a catalyst, for example aluminium chloride, at a temperature between 130°C. and 180°C., optionally in the presence of an inert organic solvent such as 1,1,2,2-tetrachloroethane.

Compounds of general formula IV may be prepared by known methods for the preparation of esters of p-alkanamidophenols.

The compounds of general formula I may be converted into acid addition salts by known methods, e.g. by the action of an acid on the compounds of general formula I in an appropriate solvent such as diethyl ether. The acid addition salt which is formed is precipitated, if necessary after concentration of its solution, and is separated by filtration or decantation.

For use in medicine, the compounds of general formula I are employed as such or in the form of non-toxic acid addition salts (i.e. salts containing anions which are non-toxic at the dosages used) such as salts derived from inorganic acids (e.g. hydrochlorides, hydrobromides, phosphates, sulphates and nitrates) and from organic acids (e.g. oxalates, lactates, tartrates, acetates, salicylates, citrates, propionates, succinates, fumarates, maleates, methylene-bis-β-hydroxynaphthoates, gentisates and D-di-p-toluoyl-tartrates.

By the term "known methods" as used in this specification is meant methods heretofore used or described in the literature.

The following Examples illustrate the preparation of compounds of the present invention.

EXAMPLE 1

A mixture of 5'-acetamido-2'-(2,3-epoxypropoxy)acetophenone (17 g.), isopropylamine (100 ml.), and dry ethanol (100 ml.) was heated under reflux for 24 hours. The excess of isopropylamine and ethanol was evaporated and the residue was dissolved in chloroform. The solution was extracted with dilute hydrochloric acid and the acid extract was made alkaline with sodium hydroxide and then extracted with chloroform. The chloroform solution was dried and evaporated. The residue was treated with light petroleum and the solid obtained was recrystallised from ethyl acetate to give 5'-acetamido-2'-(2-hydroxy-3-isopropylaminopropoxy)acetophenone, m.p. 131°–134°C.

The 5'-acetamido-2'-(2,3-epoxypropoxy)acetophenone used as starting material was prepared as follows:

5'-Acetamido-2'-hydroxyacetophenone (19.6 g., prepared according to M. Julia & M. Baillarge, Bull. Soc. chim. Fr., 1952, 639) was dissolved in the minimum amount of dry ethanol. A solution of sodium ethoxide, prepared from sodium (2.3 g.) and ethanol, was added and the solid which separated was removed by filtration, washed with a little dry diethyl ether and dried in a vacuum-desiccator overnight. The solid was placed in a Soxhlet extractor and a boiling solution of epichlorohydrin (28.3 g.) in ethanol was used to extract the solid overnight. Diethyl ether was added to the cooled solution, the sodium chloride was filtered off and the filtrate was evaporated. The residue was extracted with benzene and the extract evaporated to give 5'-acetamido-2'-(2,3-epoxypropoxy)acetophenone, m.p. 105°–112°C.

EXAMPLE 2

2'-(2,3-Epoxypropoxy)-5'-propionamidoacetophenone (7 g.), isopropylamine (40 g.) and methanol (200 ml.) were heated together under reflux for 1 ½ hours. The reaction mixture was concentrated under reduced pressure and the residual oil was treated with N hydrochloric acid and ethyl acetate. The acid extract was brought to pH 11 with 2N aqueous sodium hydroxide solution and then extracted with chloroform. The dried chloroform extract was concentrated to give an oil, which was treated with diethyl ether to give 2'-(2-hydroxy-3-isopropylaminopropoxy)-5'-propionamidoacetophenone (5.5 g.), m.p. 110°–113°C.

The following compounds were prepared similarly:

2'-(2-hydroxy-3-isopropylaminopropoxy)-5'-isobutyramidoacetophenone, m.p. 102°–104°C., from 2'-(2,3-epoxypropoxy)-5'-isobutyramidoacetophenone;

2'-(2-hydroxy-3-isopropylaminopropoxy-5'-valeramidoacetophenone, m.p. 129°–131°C., from 2'-(2,3-epoxypropoxy)-5'-valeramidoacetophenone;

2'-(2-hydroxy-3-isopropylaminopropoxy)-5'-isovaleramidoacetophenone, m.p. 110°–111°C., from 2'-(2,3-epoxypropoxy)-5'-isovaleramidoacetophenone;

5'-hexanamido-2'-(2-hydroxy-3-isopropylaminopropoxy)acetophenone, m.p. 141°–142°C., from 2'-(2,3-epoxypropoxy)-5'-hexanamidoacetophenone;

2'-(2-hydroxy-3-isopropylaminopropoxy)-5'-octanamidoacetophenone, m.p. 117°–119°C., from 2'-(2,3-epoxypropoxy)-5'-octanamidoacetophenone;

2'-(2-hydroxy-3-isopropylaminopropoxy)-5'-nonanamidoacetophenone, m.p. 108°–109°C., from crude 2'-(2,3-epoxypropoxy)-5'-nonanamidoacetophenone;

5'-butyramido-2'-(2-hydroxy-3-methylaminopropoxy)acetophenone, m.p. 143°–146°C., from 5'-butyramido-2'-(2,3-epoxypropoxy)acetophenone (prepared as described in Example 4), and 2'-(3-tert-butylamino-2-hydroxypropoxy)-5'-butyramidoacetophenone, m.p. 138°C., from 5'-butyramido-2'-(2,3-epoxypropoxy)acetophenone (prepared as described in Example 4).

2'-(2,3-Epoxypropoxy)-5'-propionamidoacetophenone used as starting material was prepared as follows:

p-Propionamidophenol (82 g.; prepared according to Fierz-David and Kuster, Helv. chim. Acta, 1939, 22 82) acetyl chloride (40 g.) and benzene (1 litre) were heated under reflux until a solution formed (1 hour). This solution was cooled and added to water and the precipitated solid was removed by filtration, washed with water and dried to give p-propionamidophenyl acetate (50 g.), m.p. 100°–105°C. A mixture of p-propionamidophenyl acetate (50 g.) and aluminum chloride (100 g.) was heated at 170°C. for 5 hours. An excess of water was added to the cooled mixture and the solid residue was removed by filtration and recrystallised from aqueous ethanol to give 2'-hydroxy-5'-propionamidoacetophenone (16 g.), m.p. 116°–120°C. A solution of 2'-hydroxy-5'-propionamidoacetophenone (11.5 g.) in ethanol (200 ml.) was added to an ethanolic solution of sodium ethoxide prepared from sodium (1.27 g.) and ethanol (200 ml.). The resulting solution was evaporated to dryness under reduced pressure. Benzene was added and the solution was again evaporated to dryness under reduced pressure. Dimethylformamide (100 ml.) and epichlorohydrin (20 ml.) were added and the solution was heated at 100°C. for 4 hours. The solution was concentrated under reduced pressure to give an oil which was then treated with water to give a solid which was recrystallised from ethyl acetate to give 2'-(2,3-epoxypropoxy)-5'-propionamidoacetophenone (7.1 g.), m.p. 120°–125°C.

The following compounds were prepared similarly:

2'-(2,3-epoxypropoxy)-5'-isobutyramidoacetophenone, m.p. 123°–127°C., from 2'-hydroxy-5'-isobutyramidoacetophenone;

2'(2,3-epoxypropoxy)-5'-valeramidoacetophenone, m.p. 137°–139°C., from 2'-hydroxy-5'-valeramidoacetophenone;

2'(2,3-epoxypropoxy)-5'-isovaleramidoacetophenone, m.p. 95°–100°C., from 2'-hydroxy-5'-isovaleramidoacetophenone;

2'-(2,3-epoxypropoxy)-5'-hexanamidoacetophenone, m.p. 136°–137°C., from 5'-hexanamido-2'-hydroxyacetophenone;

2'-(2,3-epoxypropoxy)-5'-octanamidoacetophenone, m.p. 133°–134°C., from 2'-hydroxy-5'-octanamidoacetophenone, and crude 2'-(2,3-epoxypropoxy)-5'-nonanamidoacetophenone from 2'-hydroxy-5'-nonanamidoacetophenone.

The intermediate 2'-hydroxy-5'-isobutyramidoacetophenone was prepared as follows:

Isobutyric anhydride (17.5 g.) was added dropwise with stirring to a mixture of 5'-2'-hydroxyacetophenone (13.7 g.; prepared according to M. Julia & M. Baillarge, Bull, Soc. chim. Fr., 1952, 639), isobutyric acid (10 g.), and water (25 ml.) which was heated on the steam-bath. Heating and stirring were continued for a further 1 hour, and the mixture was cooled. After the addition of a further quantity (25 ml.) of water, a solid separated. This was filtered off, dried, and triturated with diethyl ether. The solid was filtered off and dried to give 2'-hydroxy-5'-isobutyramidoacetophenone (14.15 g.), m.p. 131°–132°C.

The following compounds were prepared similarly:

2'-hydroxy-5'-valeramidoacetophenone, m.p. 112°–115°C.;

2'-hydroxy-5'-isovaleramidoacetophenone, m.p. 119°–120°C.;

5'-hexanamido-2'-hydroxyacetophenone, m.p. 120°–121°C.;

2'-hydroxy-5'-octanamidoacetophenone, m.p. 108°–110°C., and

2'-hydroxy-5'-nonanamidoacetophenone, m.p. 55°–60°C.

EXAMPLE 3

2'-(2,3-Epoxypropoxy)-5'-propionamidopropiophenone (14 g.), isopropylamine (80 g.) and methanol (200 ml.) were heated together under reflux for 1 ½ hours. The reaction mixture was then concentrated under reduced pressure to give a residual oil which was recrystallised from ethyl acetate to give 2'-(2-hydroxy-3-isopropylaminopropoxy)-5'-propionamidopropiophenone (13 g.), m.p. 89°–92°C.

2'-(2,3-Epoxypropoxy)-5'-propionamidopropiophenone used as starting material was prepared as follows:

A solution of 2'-hydroxy-5'-propionamidopropiophenone (30 g.; prepared according to Raval and Thakor, J. Indian Chem. Soc. 1961, 38, 421) in ethanol (200 ml.) was added to an ethanolic solution of sodium ethanoxide prepared from sodium (3.12 g.) and ethanol (200 ml.). The resulting solution was evaporated to dryness under reduced pressure. Benzene was added and the solution was again evaporated to dryness under reduced pressure. Dimethylformamide (200 ml.) and epichlorohydrin (50 ml.) were added and the solution was heated at 100°C. for 4 hours. The solution was concentrated under reduced pressure to give an oil which was then treated with water to give a solid which was recrystallised from ethyl acetate to give 2'-(2,3-epoxypropoxy)-5'-propionamidopropiophenone 18.4 g.) m.p. 114°–118°C.

EXAMPLE 4

Crude 5'-butyramido-2'-(2,3-epoxypropoxy)acetophenone (16 g.), isopropylamine (20 g.) and ethanol (100 ml.) were heated together under reflux for 4 hours. The reaction mixture was concentrated under reduced pressure and the residual oil was dissolved in N hydrochloric acid. The acid solution was extracted with ethyl acetate, the ethyl acetate layers being discarded. The acidic solution was brought to pH 11 with 2N aqueous sodium hydroxide solution and then extracted with chloroform. The dried chloroform extracts were concentrated under reduced pressure to give an oil which was crystallised from a mixture of ethanol and diethyl ether to give 5'-butyramido-2'-(2-hydroxy-3-isopropylaminopropoxy)acetophenone (3 g.), m.p. 119°–123°C.

Similarly prepared was 5'-butyramido-2'(3-cyclohexylamino-2-hydroxypropoxy)acetophenone, m.p. 112°–113°C.

Crude 5'-butyramido-2'-(2,3-epoxypropoxy)acetophenone used as starting material was prepared as follows:

p-Butyramidophenol (58 g.; prepared according to Fierz-David and Kuster, loc.cit.), acetyl chloride (25.4 g.) and benzene (500 ml.) were heated together under reflux until a solution formed (12 hours). This solution was cooled and treated with water. The benzene layer was separated and the aqueous layer was again extracted with benzene.

The combined benzene extracts were dried and evaporated to dryness under reduced pressure to give p-butyramidophenyl acetate (38 g.) as an off-white solid, m.p. 102°–103°C. A mixture of p-butyramidophenyl acetate (38 g.), aluminium chloride (80 g.) and 1,1,2,2-tetrachloroethane (250 ml.) was heated at 140°C. for 3 hours. The reaction mixture was cooled and treated with iced water. The tetrachloroethane layer was separated and the aqueous layer was extracted with chloroform. The combined organic layers were extracted with 2N aqueous sodium hydroxide and the alkaline solution was acidified to pH 5 with concentrated hydrochloric acid. The acidified solution was extracted with chloroform and the chloroform extract was dried and concentrated under reduced pressure to give 5'-butyramido-2'-hydroxyacetophenone (15.6 g.), m.p. 114°–117°C. A solution of 5'-butyramido-2'-hydroxyacetophenone (15.6 g.) in ethanol (100 ml.) was added to an ethanolic solution of sodium ethoxide which was prepared from sodium (1.62 g.) and ethanol (100 ml.). The resulting solution was evaporated to dryness under reduced pressure and dimethylformamide (100 ml.) was added to the solid residue. Approximately 10 ml. of dimethylformamide was removed by distillation under reduced pressure. Epichlorohydrin (25 ml.) was added and the solution was heated at 100°C. for 4 hours. The solution was concentrated under reduced pressure to give a residual oil which was treated with water to give a solid. The solid was dissolved in ethanol and the resulting solution was treated with charcoal, filtered and concentrated under reduced pressure to give crude 5'-butyramido-2'-(2,3-epoxypropoxy)acetophenone (16 g.), m.p. 110°–116°C.

The crude compound may be purified by recrystallisation from ethyl acetate, after treatment with decolourizing charcoal, to give pure 5'-butyramido-2'-(2,3-epoxypropoxy)acetophenone, m.p. 136°–138°C.

EXAMPLE 5

5'-Butyramido-2'-(2-hydroxy-3-isopropylaminopropoxy)acetophenone (3.36 g.; prepared as described in Example (4) was dissolved in anhydrous methanol (50 ml.), and anhydrous diethyl ether (200 ml.) added. A saturated solution of anhydrous hydrogen chloride in anhydrous diethyl ether (25 ml.) was added dropwise with stirring. An oil was precipitated, which crystallized on further stirring. The solid was filtered off and recrystallized from a mixture of anhydrous methanol and anhydrous diethyl ether to give 5'-butyramido-2'-(2-hydroxy-3-isopropylamino-propoxy)acetophenone hydrochloride (2.5 g.), m.p. 141°–143°C.

EXAMPLE 6

Boiling solutions of 5'-butyramido-2'-(2-hydroxy-3-isopropylaminopropoxy)acetophenone (3.36 g.; prepared as described in Example (4) in acetone (250 ml.) and of D-tartaric acid (1.5 g.) in acetone (50 ml.) were mixed, and the mixture allowed to cool overnight. The solid which separated was filtered off to give 5'-butyramido-2'-(2-hydroxy- 3-isopropylaminopropoxy)acetophenone D-tartrate (3.7 g.)., m.p. 175°–179°C.

The present invention includes within its scope pharmaceutical compositions which comprise at least one of the benzene derivatives of general formula I, or a non-toxic acid addition salt thereof, in association with a pharmaceutically-acceptable carrier or coating. In clinical practice the compounds of the present invention will normally be administered orally or parenterally.

Solid compositions for oral administration include compressed tablets, pills, powders and granules. In such solid compositions, at least one of the active compounds is admixed with at least one inert diluent such as starch, sucrose or lactose. As is normal practice the compositions may also contain additional substances other than inert diluents, e.g. lubricating agents, such as magnesium stearate.

Liquid compositions for oral administration include pharmaceutically-acceptable emulsions, solutions, suspensions, syrups and elixirs containing inert diluents commonly used in the art, such as water and liquid paraffin. Besides inert diluents such compositions may also contain adjuvants, such as wetting and suspending agents, and sweetening, flavouring, perfuming and preserving agents. According to the invention, the compounds for oral administration also include capsules of absorbable material, such as gelatin, containing one or more of the active substances with or without the addition of diluents or excipients.

Preparations according to the invention for parenteral administration include sterile aqueous, aqueous-organic, and organic solutions, suspensions and emulsions. Examples of organic solvents or suspending media are propylene glycol, polyethylene glycol, vegetable oils such as olive oil and injectable organic esters such as ethyl oleate. These compositions may also contain adjuvants such as stabilising, preserving, wetting, emulsifying and dispersing agents.

They may be sterilized, for example by filtration through a bacteria-retaining filter, by incorporation of sterilising agents in the compositions, by irradiation or by heating. They may also be manufactured in the form of sterile solid compositions which can be dissolved in sterile water or some other sterile injectable medium immediately before use.

The percentage of active ingredient in the compositions of the invention may be varied so that a suitable dosage is obtained. Obviously, several unit dosage forms may be administered at about the same time. The dose employed depends upon the desired therapeutic effect, the route of administration and the duration of the treatment. In the adult, the doses are generally between 0.1 and 0.5 mg./kg. body weight per day by intravenous administration. However, the new compounds will usually be self-administered by the patient and oral administration is therefore preferred, by which route of administration the doses are generally between 1 and 10 mg/kg. body weight per day in the adult.

The following Examples illustrate pharmaceutical compositions according to the invention.

EXAMPLE 7

Tablets of the formula:

| | |
|---|---|
| 2'-(2-hydroxy-3-isopropylaminopropoxy)-5'-propionamidopropiophenone | 20 mg. |
| lactose | 49.5 mg. |
| starch | 20 mg. |
| dextrin | 20 mg. |
| magnesium stearate | 0.5 mg. | were prepared by intimately mixing the amine, lactose, starch and dextrin and passing the mixture through a 60-mesh British Standard sieve. After addition of the magnesium stearate, the mixture was granulated to a suitable size and the granules compressed to form tablets.

EXAMPLE 8

An injectable solution of the following composition:

| | |
|---|---|
| 2'-(2-hydroxy-3-isopropylaminopropoxy)-5'-propionamidopropiophenone hydrochloride | 2.5 g. |
| distilled water | up to 100 ml. | was prepared by dissolving the amine hydrochloride in the distilled water. The solution was filtered and filled into ampoules which were sterilized in an autoclave.

EXAMPLE 9

Tablets of the formula:

| | |
|---|---|
| 5'-butyramido-2'-(2-hydroxy-3-isopropylaminopropoxy)acetophenone | 20 mg. |
| lactose | 49.5 mg. |
| starch | 20 mg. |

-Continued

| | |
|---|---|
| dextrin | 20 mg. |
| magnesium stearate | 0.5 mg. | were prepared by intimately mixing the amine, lactose, starch and dextrin and passing the mixture through a 60-mesh British Standard sieve. After addition of the magnesium stearate, the mixture was granulated to a suitable size and the granules compressed to form tablets.

We claim:

1. A pharmaceutical composition which comprises, as the active ingredient, an effective amount for the treatment or prophylaxis of angina pectoris or cardiac arrhythmia of a compound of the formula:

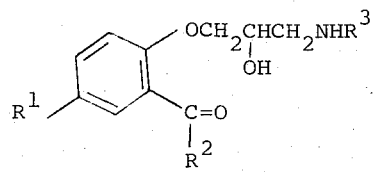

wherein $R^1$ represents alkanoylamino of one through nine carbon atoms, $R^2$ represents alkyl of one through six carbon atoms, and $R^3$ represents alkyl of one through six carbon atoms or cycloalkyl of three through six carbon atoms, or a non-toxic acid addition salt thereof, in association with a pharmaceutically-acceptable carrier.

2. A method of treatment or prophylaxis of a cardiac disorder in a patient suffering from angina pectoris or cardiac arrhythmia which comprises administering orally or intravenously to the patient a compound of the formula:

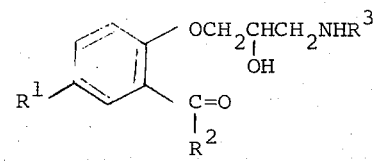

wherein $R^1$ represents alkanoylamino of one through nine carbon atoms, $R^2$ represents alkyl of one through six carbon atoms, and $R^3$ represents alkyl of one through six carbon atoms or cycloalkyl of three through six carbon atoms, or a non-toxic acid addition salt thereof, when administered orally in an amount between 1 and 10 mg/kg body weight per day and when administered intraveneously in an amount between 0.1 and 0.5 mg/kg body weight per day.

3. The method according to claim 2 in which the said compound is 5'-butyramido-2'-(2-hydroxy-3-isopropylaminopropoxy) acetophenone or a non-toxic acid addition salt thereof.

* * * * *